Patented Oct. 16, 1951

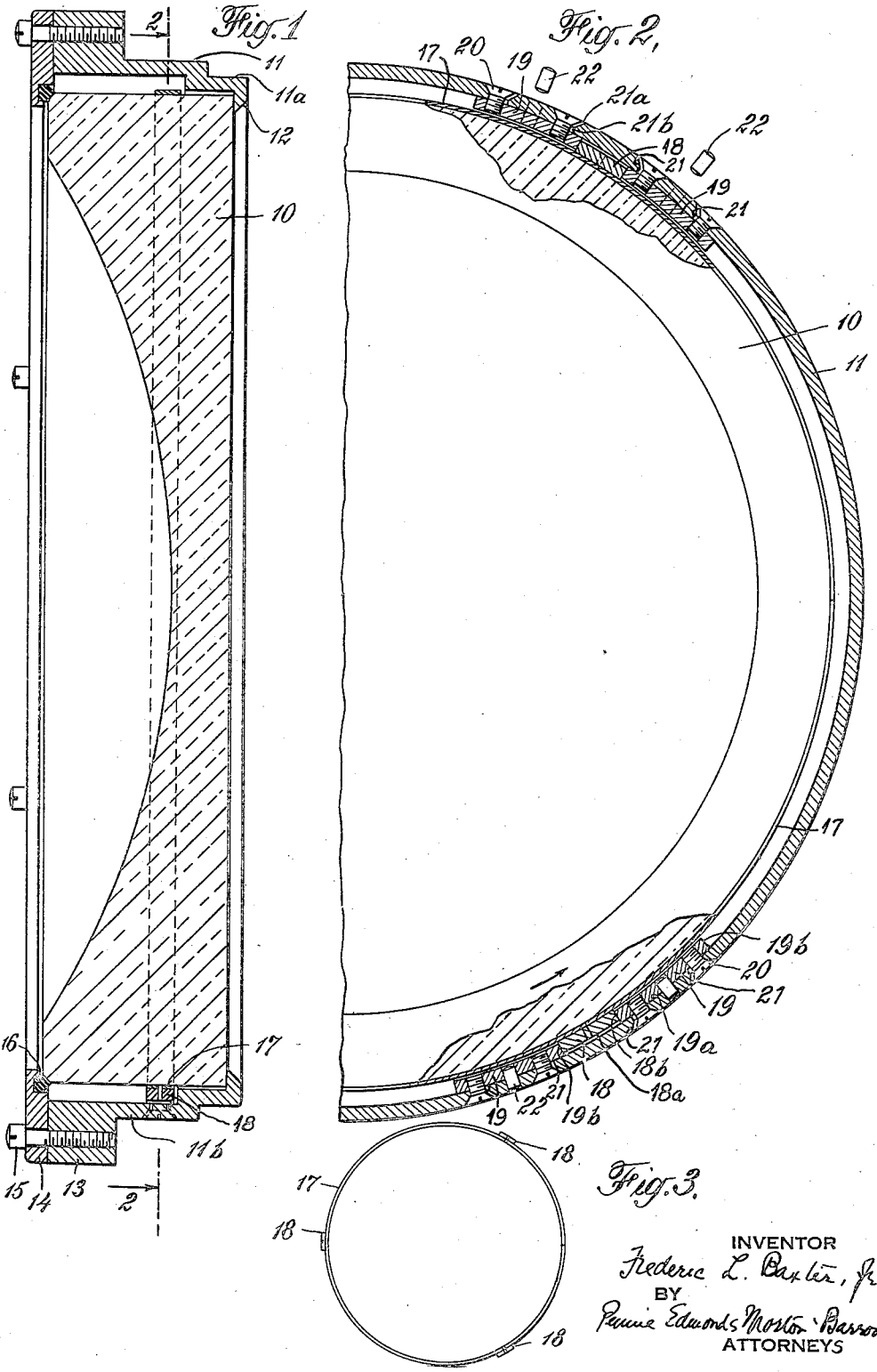

2,571,186

UNITED STATES PATENT OFFICE 2,571,186

LENS MOUNT

Frederic L. Baxter, Jr., Pound Ridge, N. Y., assignor to The Perkin-Elmer Corporation, Glenbrook, Conn.

Application July 18, 1950, Serial No. 174,377

10 Claims. (Cl. 88—57)

This invention relates to mounts for optical elements, such as lenses and mirrors, and is concerned more particularly with a novel mount for an optical element, which facilitates centering the element, holds the element firmly in centered position, even though the assembly is subjected to strong forces, and permits the element to expand and contract freely without altering its centering. The new mount is of simple construction, easy to assemble, and light in weight, and an optical element in the mount is not subjected to localized stresses and need not be slotted or drilled. The new mount is especially adapted for supporting the large elements of lenses used in cameras for aerial photography and, since all the advantages of the invention are realized in that application, a form of the mount suitable for such use will be illustrated and described in detail for purposes of explanation.

In the mounting of the elements of a lens, which is to be exposed to wide variations in temperature, one method commonly used heretofore has involved making the cell for each element of the lens of a metal having a coefficient of thermal expansion as close as possible to that of the glass of which the element is made. Such mounts are open to a number of objections, in that the machining of the cells and the mounting of the elements therein with the desired accuracy are difficult operations and the centering of the elements in their cells usually requires that shims or pads be used. The insertion of such shims or pads between the element and its cell must be done with the utmost care and, even so, may result in the development of excessive differential pressures on the element.

Various other expedients for mounting an optical element in its cell in such manner as to avoid damage to the element as a result of temperature changes have been proposed heretofore, but the prior methods, with which I am familiar, have all been open to objection. Thus, one prior method involves mounting the element on three radial pins or keys spaced equiangularly about the circumference of the element, the pins being attached to the inner wall of the cell and entering openings in the element. In alternative forms of this type of mount, the keys are secured to pins inserted in openings in the edge of the element and enter openings in the wall of the cell, or the keys are cemented to the edge of the element. All such mounts are undesirable because of centering difficulties in the initial assembly and the use of those mounts, which require drilling or slotting of the element, involves the risk of losing the element in the drilling or slotting operation. The mounts, in which keys are cemented to the element, are objectionable because of the uncertain life of the cement and, if the members cemented to the element are not made of a material having the same coefficient of expansion as the glass, excessive stresses are applied to the element at the margins of the cemented areas.

The present invention is directed to the provision of a novel mount for an optical element, which facilitates initial centering of the element and permits the element to expand and contract freely and without damage thereto in response to wide variations in temperature. The new mount includes a thin endless metallic band, which is provided with a plurality of blocks attached to its outer surface and equiangularly spaced. The band is applied with a press fit to encircle the element and is of such dimensions that, at normal temperatures, the band fits the element snugly. The blocks attached to the band have outer surfaces concentric with the band and end surfaces extending radially. The mount also includes a cell made of any suitable metal and having a section for receiving the element with the band in place. The section of the cell carries on its inner surface as many pairs of setting blocks as there are blocks on the band and the pairs of setting blocks are spaced equiangularly and have radial end surfaces. The setting blocks of each pair are spaced to receive a block on the band between them and they are mounted on the cell section for adjustment circumferentially thereof. When the element is in place in the mount, it is supported by engagement of the blocks on the band with the setting blocks and, when the element expands or contracts, the blocks on the band move radially between thier respective setting blocks. The adjustability of the setting blocks makes it easy to center the element, and, once it has been centered, it is anchored in place by pins inserted in bores drilled through the cell wall and into the setting blocks.

For a better understanding of the invention, reference may be made to the accompanying drawing, in which:

Fig. 1 is a vertical sectional view through a lens supported in one form of the new mount;

Fig. 2 is a fragmentary sectional view on the line 2—2 of Fig. 1; and

Fig. 3 is a plan view of the band of the mount on a smaller scale.

The mount shown in the drawing is for a dispersive lens element 10 and it includes a cell 11, which may be of any suitable material and is preferably made of one of the light metal alloys, when the mount is to be used in a camera for aerial photography. The cell is provided with a cylindrical section 11a having an inwardly extending flange 12, which the lens is to abut, and the other section 11b of the cell is of greater diameter than section 11a. Section 11b of the cell is provided with an outwardly extending flange 13 and the lens is held in place by a ring 14 secured to the radial face of flange 13 by bolts 15 and overlying the edge of the lens. Ring 14 is formed with a circumferential channel in its inner face near its inner edge and a rubber gasket 16 is seated in the channel and bears against the outer face of the lens near its outer edge.

The mount comprises a thin endless metallic band 17, which is relatively narrow and is of such internal diameter that it may be applied with a press fit to encircle the lens. Thereafter, if desired, a thin fluent cement may be applied at the edges of the band to spread evenly by capillarity between the band and lens. The band may be made of a suitable stainless or mild steel and it is sufficiently elastic to permit it to stretch, when the lens expands because of a temperature rise. At normal temperatures, the band fits the lens snugly and grips the lens somewhat more tightly at temperatures below normal. However, the pressure exerted by the band on the lens at temperatures within limits below normal is not sufficient to cause important distortion of the lens because of the large area of contact of the band with the lens.

Before the band is applied to the lens, three blocks 18 are secured to the outer surface thereof at a spacing of 120°. The blocks may be made of the same material as the band and they have curved outer surfaces 18a concentric with the band end surfaces 18b extending radially relative to the band. The band is applied to the lens in such manner that, when the lens is in place in the cell, the band will lie within section 11b of the cell. The inner diameter of section 11b is, accordingly, made slightly greater than the diameter of a circle passing through the outer surfaces 18a of blocks 18.

Section 11b of the cell carries three pairs of setting blocks 19, which may be made of the same material as the cell, and each block has a curved surface 19a concentric with cell section 11b and in contact with the inner surface thereof. The end surfaces 19b of the setting blocks extend radially relative to the cell section, and the spacing between the opposed end surfaces 19b of a pair of setting blocks is slightly greater than the length of a block 18 taken circumferentially of the band.

Each setting block is held in place by a pair of screws 20, which pass through openings 21 in the wall of cell section 11b and have threaded shanks entering openings in the blocks. Each screw 20 has a frusto-conical head and each opening 21 in the wall of section 11b has a counter-sunk portion 21a receiving the head of the screw and a cylindrical portion 21b, through which the shank of the screw extends. The portions 21a and 21b of the opening for each screw are somewhat larger than the parts of the screw which they receive and, when the setting blocks 19 of a pair are spaced to receive a block 18 on band 17 between them, the heads of the screws of the two blocks engage opposite sides of the counter-sunk portions 21a of the openings for the screws. When the lens is in place with its blocks 18 lying between the setting blocks 19 of respective pairs, the lens may be shifted to center it by backing out the screws holding certain setting blocks and driving in the screws of the associated setting blocks. It will be understood that the amount of shift required to center the lens is very small and the setting blocks are capable of the necessary adjustment for that purpose by manipulation of their screws, as described.

When the lens has been properly centered, it is anchored in place by pins 22 inserted into openings drilled through the wall of cell section 11b and into each setting block 19 between the screws 20 holding that block in place. When the lens has thus been permanently centered, it remains in position indefinitely but, at the same time, is free to expand and contract with temperature changes. As a result of such expansion and contraction, the blocks 18 attached to the lens band move radially inwardly or outwardly relative to the setting blocks 19 between which they are held but the position of the lens does not change.

In the new mount, the lens may be slipped into the cell from the open end with its band blocks entering the spaces between the setting blocks of the three pairs, so that the initial assembly is simple. In the production of the mount, little machining is required and the attachment of blocks 18 to the band can be effected by welding or brazing in simple preliminary operations.

The mount described includes a band carrying three blocks spaced 120° apart and three pairs of setting blocks similarly spaced along the inner surface of the cell section. With this arrangement, angular adjustment of the setting blocks causes the center of the optical element to move along an arcuate path, but the radius of the arc is so great that the departure of the path of the center from a straight line is negligible. A mount supporting the element at three points is preferred, but, if desired, the mount may include a band carrying more than three blocks received between setting blocks of a corresponding number of pairs. If the band carries four blocks, the centering of the optical element may be carried out by adjustment of the setting blocks to cause the center of the element to move along one or the other of two paths lying at right angles to each other.

I claim:

1. A mount for an optical element, which comprises a band adapted to encircle the element and fit its periphery snugly at normal temperatures, the band having at least three like projections secured to and extending outwardly from the band, the projections being equally spaced circumferentially of the band, a cell having a section, into which the banded element may be inserted, a plurality of separate means on the section of the cell defining recesses for receiving respective projections on the band and thereby supporting the banded element, while permitting free radial movement of said projections, and means operable to shift the recess-defining means and the projections circumferentially of the cell section to center the element.

2. A mount for an optical element, which comprises a band adapted to encircle the element and fit its periphery snugly at normal temperatures, the band having at least three like projections secured to and extending outwardly from the band, the projections being equally spaced circumferentially of the band, a cell having a section into which the banded element may be inserted, a plurality of separate means mounted on the inner surface of the section of the band defining recesses for receiving respective projections on the band and thereby supporting the banded element, while permitting free radial movement of said projections, and means operable to shift the recess-defining means and the projections circumferentially of the cell section to center the element.

3. A mount for an optical element, which comprises a band adapted to encircle the element and fit its periphery snugly at normal temperatures, the band having at least three like projections secured to and extending outwardly from the band, the projections being equally spaced circumferentially of the band, a cell having a section, into which the banded element may be inserted, separate means on the section of the cell defining recesses for receiving respective projections on the band and thereby supporting the banded element, means operable to shift the recess-defining means and the projections circumferentially of the cell section to center the element, and means for locking the recess-defining means in shifted position.

4. A mount for an optical element, which comprises a band adapted to encircle the element and fit its periphery snugly at normal temperatures, the band having at least three like projections secured to and extending outwardly from the band, the projections having radial surfaces and being equally spaced circumferentially of the band, a cell having a section, into which the banded element may be inserted, separate means on the section of the cell defining recesses with radial surfaces for receiving respective projections on the band and thereby supporting the banded element, while permitting free radial movement of said projections, and means operable to shift the recess-defining means and the projections circumferentially of the cell section to center the element.

5. A mount for an optical element, which comprises a band adapted to encircle the element and fit its periphery snugly at normal temperatures, the band having at least three like projections secured to and extending outwardly from the band, the projections being equally spaced circumferentially of the band, a cell having a section, into which the banded element may be inserted, separate means on the section of the cell defining recesses for receiving respective projections on the band and thereby supporting the banded element, while permitting free radial movement of said projections, means operable to shift the recess-defining means and the projections circumferentially of the cell section to center the element, and means on the cell engageable with opposite ends of the element to prevent axial movement thereof.

6. A mount for an optical element which comprises a cell having a section, at least three pairs of setting blocks equiangularly spaced circumferentially of the section on the inner face thereof, the blocks of each pair being circumferentially spaced and having opposed faces extending radially of the section, means securing each block in place on the section and operable to shift the block circumferentially of the section, a band adapted to encircle the element and fit its periphery snugly at normal temperatures, the band being receivable within the section in line with the setting blocks, and a plurality of blocks secured to and spaced along the outer surface of the band, the blocks on the band being receivable in the spaces between the setting blocks of the respective pairs and movable radially relatively to said setting blocks.

7. A mount for an optical element, which comprises a cell having a section, at least three pairs of setting blocks equiangularly spaced circumferentially of the section on the inner face thereof, the blocks of each pair being circumferentially spaced and having opposed faces extending radially of the section, means securing each block in place on the section and operable to shift the block circumferentially of the section, a band adapted to encircle the element and fit its periphery snugly at normal temperatures, the band being receivable within the section in line with the setting blocks, and a plurality of blocks secured to and spaced along the outer surface of the band, the blocks on the band being receivable in the spaces between the setting blocks of the respective pairs and having faces extending radially of the section and in contact with the opposed faces of the setting blocks, the blocks on the band being movable radially relative to the setting blocks between which they lie.

8. A mount for an optical element, which comprises a cell having a section, at least three pairs of setting blocks equiangularly spaced circumferentially of the section and having opposed faces extending radially of the section, a screw threaded into each block through an opening in the wall of the section, the screw having a frusto-conical head and a threaded shank and the opening having a counter-sunk entrance for receiving the head and a cylindrical portion for receiving the shank of the screw, the entrance and cylindrical portion of the opening being larger than the parts of the screw received therein, a band adapted to encircle the element and fit its periphery snugly at normal temperatures, the band being receivable within the section in line with the setting blocks, and a plurality of blocks secured to and spaced along the outer surface of the band, the blocks on the band being receivable in the spaces between the setting blocks of the respective pairs and movable radially relatively to said setting blocks.

9. A mount for an optical element, which comprises a band adapted to encircle the element and fit its periphery snugly at normal temperatures, the band having at least three like projections secured to and extending outwardly from the band at equal spacings circumferentially of the band, a cell having a section, into which the banded element may be inserted, separate means on the inner surface of the section of the cell defining recesses for receiving respective projections and thereby supporting the banded element, and means operable from outside the cell for shifting the recess-defining means and the projections circumferentially of the cell to center the element.

10. A mount for an optical element, which comprises an integral endless band adapted to encircle the element and fit its peripheral surface snugly at normal temperatures, the band being substantially narrower than said surface and lying inward from the edges thereof, at least three like projections secured to and extending outwardly from the band at equal spacings circumferentially of the band, a cell having a section, into which the banded element may be inserted, separate means on the section of the cell defining recesses for receiving respective projections on the band and thereby supporting the banded element while permitting free radial movement of the projections, and means for shifting the recess-defining means and the projections circumferentially of the cell to center the element.

FREDERIC L. BAXTER, JR.

REFERENCES CITED

The following references are of record in the file of this patent:

UNITED STATES PATENTS

| Number | Name | Date |
|---|---|---|
| 1,057,262 | Oldfield | Mar. 25, 1913 |
| 1,169,761 | Bausch | Feb. 1, 1916 |
| 1,417,326 | Jacobsson | May 23, 1922 |
| 2,097,850 | Wallace | Nov. 2, 1937 |
| 2,240,827 | Bangert et al. | May 6, 1941 |
| 2,394,894 | Burgert et al. | Feb. 12, 1946 |
| 2,456,053 | Doyle | Dec. 14, 1948 |